Nov. 25, 1958
C. G. SIMONS
2,861,551
FLUID OPERATED RECIPROCATING ENGINES
Filed Oct. 7, 1957
2 Sheets-Sheet 1
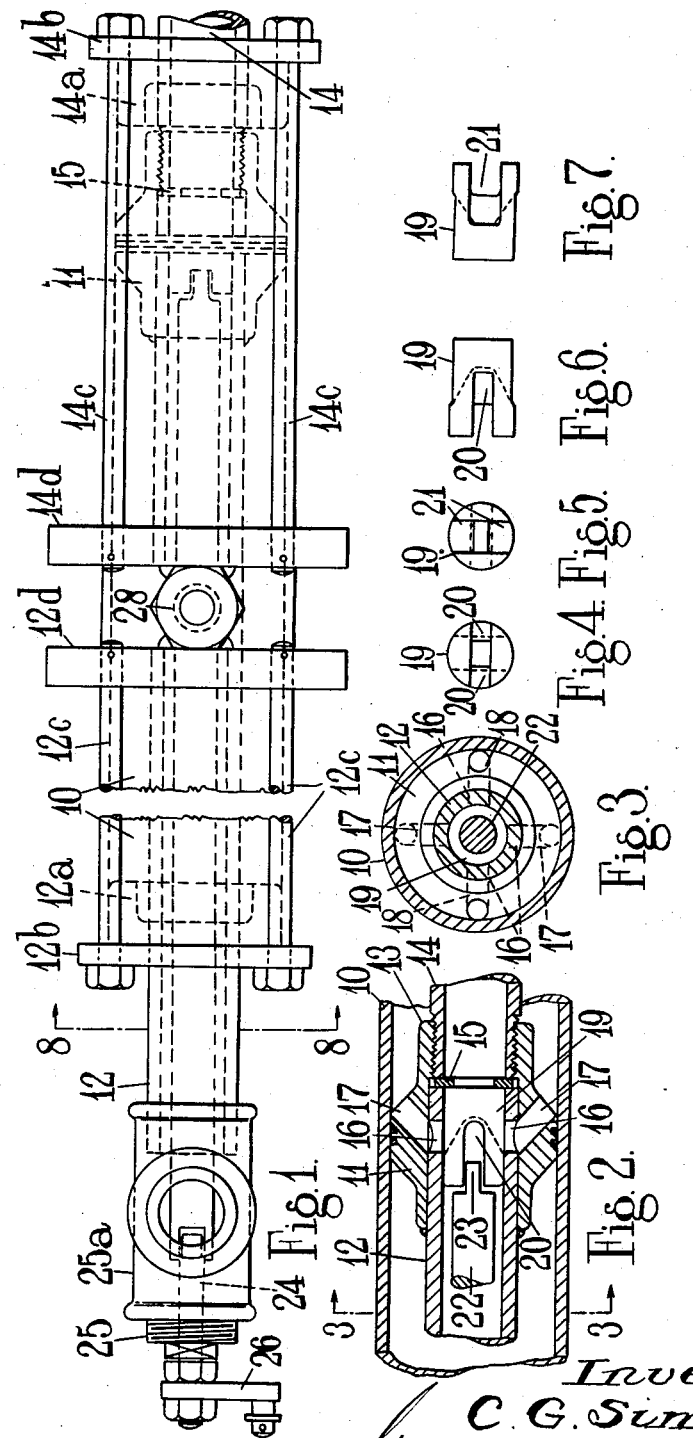
Inventor
C. G. Simons
By Glascock Downing Teebold
Attys.

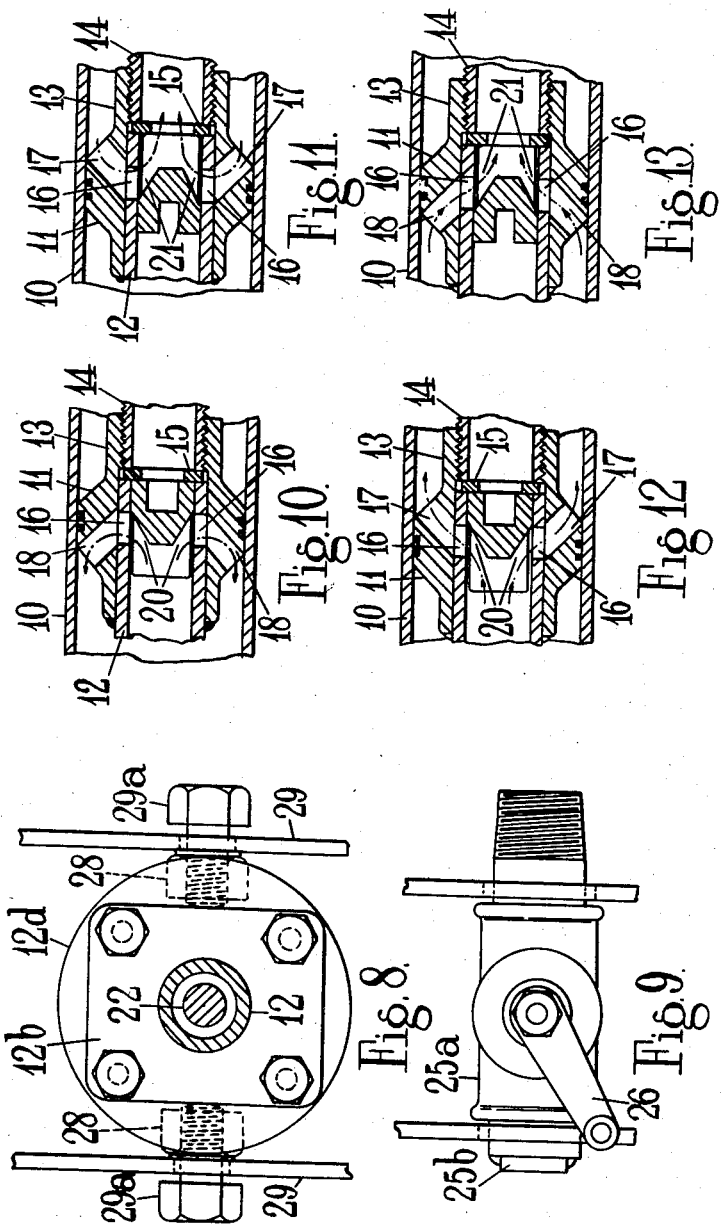

United States Patent Office 2,861,551
Patented Nov. 25, 1958

2,861,551

FLUID OPERATED RECIPROCATING ENGINES

Charles Gordon Simons, Bridge of Allan, Scotland

Application October 7, 1957, Serial No. 688,695

Claims priority, application Great Britain October 16, 1956

1 Claim. (Cl. 121—50)

This invention has reference to fluid operated reciprocating engines of the kind comprising a cylinder, a piston with tubular piston rod and valve means by which the pressure fluid supplied through the interior of the piston rod is admitted to and exhausted from the cylinder. Engines of this kind are particularly suitable for use in pile driving.

As heretofore constructed such engines are single acting, the return stroke being effected by gravity, and in consequence they will operate only when such force of gravity is effective. They will not operate when in a horizontal position or when at a small inclination to the horizontal.

The present invention has for its object to provide an engine of the kind set forth which will be double acting so that it will operate irrespective of its angle to the vertical.

According to the present invention a fluid operated engine of the kind set forth is provided with a tubular tail rod forming an extension of the piston rod and valve means by which pressure fluid supplied through the interior of the piston rod is admitted to act on each side of the piston alternately while exhausting the spent fluid on the other side of the piston through the tail rod.

According to the present invention a fluid operated reciprocating engine comprises a cylinder with closed ends, a tubular piston rod to which pressure fluid can be supplied, said rod passing through one of said ends, the piston rod having ports in the wall thereof, a tubular rail rod through which spent fluid can be exhausted, said rod forming an extension of the piston rod and passing through the other end of the cylinder, a piston fast on the piston rod and provided with passages registering with said ports, a number of the passages communicating with the cylinder on one side of the piston and the others with the cylinder on the other side of the piston, a rotary valve located within the piston rod, the valve having oppositely directed passages which, in one position of the valve, place the interior of the piston rod in communication with the passages leading to one side of the piston so that pressure fluid can be supplied thereto and place the cylinder on the other side of the piston in communication with passages leading to the tail rod so that spent fluid can be exhausted therethrough and which, in another position, place the interior of the tubular piston rod in communication with that part of the cylinder formerly being exhausted and the other part of the cylinder in communication with the tail rod and means whereby said valve can be rotated to occupy the two positions alternately.

The invention will now be described with reference to the annexed drawings wherein:

Figure 1 is an elevation of an engine in accordance with the invention, its supporting legs being omitted;

Figure 2 is a section through the cylinder, the piston rod and piston, and showing the valve;

Figure 3 is a section on the line 3—3 of Figure 2;

Figure 4 is an end view of the inlet end of the valve;

Figure 5 is an end view of the exhaust end of the valve;

Figures 6 and 7 are elevations of the valve at right angles to each other;

Figure 8 is a section on the line 8—8 of Figure 1;

Figure 9 is an end view of the engine looking to the right;

Figure 10 is a section through the piston, piston rod, cylinder and valve, the latter being in the position wherein pressure fluid is admitted to the left of the piston and the section being such that it indicates the flow of the pressure fluid through the valve;

Figure 11 is a view corresponding to Figure 10 but showing the section at right angles thereto to indicate the flow of the fluid being exhausted;

Figures 12 and 13 are views corresponding to Figures 10 and 11 respectively but showing the valve in the position wherein pressure fluid is supplied to the right of the piston and exhausted from the other side thereof.

As shown in the drawings the improved engine is provided with a cylinder 10 in which is fitted a piston 11 carried by a tubular piston rod 12. The piston is provided with an extension 13 within which is threaded the end of a tubular tail rod 14, a washer 15 being tightly sandwiched between the piston rod and tail rod. This washer forms an internally protruding rim or shoulder. The piston rod is provided with four port holes 16 evenly spaced apart circumferentially and the piston is provided with four passages the inner ends of which register with the said ports. Two of said passages 17, which are diametrically opposite, are inclined to the right, as shown in Figures 2, 11 and 12, and communicate with the cylinder to the right of the piston. The other two passages, indicated at 18 in Figures 10 and 13, which are likewise diametrically opposite, are oppositely inclined with respect to passages 17 so as to communicate with the cylinder at the other side of the piston.

Seated on the internally protruding rim or shoulder of the washer 15 is a cylindrical valve 19. At the inlet end of the valve, the left hand end as viewed in Figure 2, are two oppositely diverging fluid guide slots 20 which, according to the position of the valve, register with either pair of diametrically opposite ports 16. At the delivery end of the valve are two further oppositely diverging fluid guide slots 21 which likewise register with either pair of diametrically opposite ports 16. Thus when the valve is in one position, Figure 10, the pressure fluid passes through the guide slots 20 and passages 18 to enter the cylinder on the left of the piston and fluid from the other side of the piston passes through the passage 17 to the guide slots 21, see Figure 11, and from there is exhausted through the tail rod 14. When the valve is rotated 90° the pressure fluid is directed through the passages 17 to the cylinder on the right of the piston, see Figure 12, while the fluid on the left of the piston is exhausted through the passages 18 and guide slots 21 to the tubular tail rod, see Figure 13.

The two ends of the cylinder are sealed by means of sealing rings 12a and 14a which make sealing contact with the tubular piston rod 12 and the tail rod 14 respectively and the two sealing rings are retained against outward movement by end plates 12b and 14b anchored by means of tie bolts 12c and 14c to plates 12d and 14d welded to nuts 28 to which reference will hereafter be made.

The valve is rotated by means of a valve spindle 22 the inner end of which is provided with a tongue 23 which fits into a transverse slot in the feed end of the valve. The other end of the valve spindle is engaged by a short spindle 24 which passes through a stuffing box 25 in a crosspiece 25a screwed on the outer end of the tubular piston rod 12. To this short spindle is secured an arm 26 which may be operated either manually or through any suitable automatically acting means.

One branch of the crosspiece is connected to a compressed air or other fluid supply, not shown, and the opposite branch sealed as at 25b.

Any suitable means may be provided to retain the piston rod against axial movement. Thus the crosspiece may be anchored to a pair of fixed legs 27 as indicated in Figure 9. The cylinder is coupled by any suitable means to a member to which the power is to be transmitted. For example the cylinder may have welded thereto diametrically opposite nuts 28 or bushes to which are loosely bolted by bolts 29a movable bushed legs 29, see Figure 8. The movements of the cylinder are transmitted through said legs 29.

The valve may be continuously rotateed in the same direction or may be given a partial rotary movement first in one direction and then in the other.

When the engine is in operation fluid under pressure is admitted to the tubular piston rod and passes to one side of the piston. As the piston is fixed the cylinder is moved axially under the pressure of the fluid, the spent fluid on the other side of the piston being simultaneously exhausted through the piston and tail rod. Thereafter the valve is rotated 90° so that the pressure fluid is admitted to act on the other side of the piston and thereby move the cylinder in the reverse direction, the spent fluid on the other side of the piston being simultaneously exhausted through the tail rod. Thus by the operation of the valve the fluid is controlled to reciprocate the piston.

If desired the cylinder may be held stationary and the piston and piston rod reciprocated.

In its application to pile driving the invention provides a convenient means whereby the motive fluid may be admitted to the cylinder of the pile hammer through a piston rod instead of through a port in the cylinder. When so used the piston rod is suitably anchored, the anchorage being such that it can be advanced as the pile driving proceeds. For example the piston rod may take the reaction by means of pawls engaging ratchet teeth, the pawls advancing to engage other teeth as the work proceeds. In this manner the engine is fed forwards step by step. The cylinder may transmit its motion to a mandrel or the cylinder may be made to constitute the hammer.

What I claim is:

A fluid operated reciprocating engine comprising a cylinder with closed ends, a tubular piston rod to which pressure fluid can be supplied, said rod passing through one of said ends, the piston rod having ports in the wall thereof, a tubular tail rod through which spent fluid can be exhausted, said rod forming an extension of the piston rod and passing through the other end of the cylinder, a piston fast on the piston rod and provided with passages registering with said ports, a number of the passages communicating with the cylinder on one side of the piston and the others with the cylinder on the other side of the piston, a rotary valve located within the piston rod, the valve having oppositely directed passages which, in one position of the valve, place the interior of the piston rod in communication with the passages leading to one side of the piston so that pressure fluid can be supplied thereto and place the cylinder on the other side of the piston in communication with passages leading to the tail rod so that spent fluid can be exhausted therethrough and which, in another position, place the interior of the tubular piston rod in communication with that part of the cylinder formerly being exhausted and the other part of the cylinder in communication with the tail rod and means whereby said valve can be rotated to occupy the two positions alternately.

References Cited in the file of this patent
UNITED STATES PATENTS

| 133,784 | Lamb | Dec. 10, 1872 |
| 2,748,712 | Sargent | June 5, 1956 |